United States Patent [19]
Blaney

[11] Patent Number: 5,932,182
[45] Date of Patent: Aug. 3, 1999

[54] REACTOR FOR HIGH TEMPERATURE, ELEVATED PRESSURE, CORROSIVE REACTIONS

[75] Inventor: Carol Ann Blaney, Roswell, Ga.

[73] Assignee: Kimberly-Clark Worldwide, Inc., Neenah, Wis.

[21] Appl. No.: 09/028,142

[22] Filed: Feb. 23, 1998

Related U.S. Application Data

[63] Continuation of application No. 08/267,703, Jun. 29, 1994, abandoned.

[51] Int. Cl.⁶ ..................................................... B01J 19/00
[52] U.S. Cl. .......................... 422/240; 422/198; 422/200; 422/201; 422/203; 422/241; 422/242; 203/16; 203/19; 210/761; 588/205; 588/900
[58] Field of Search ........................... 422/198, 200–201, 422/203, 240, 241, 242; 210/761, 766; 203/16, 19; 588/205, 900

[56] References Cited

U.S. PATENT DOCUMENTS

| | | | |
|---|---|---|---|
| 4,670,404 | 6/1987 | Swift et al. | 436/147 |
| 4,721,575 | 1/1988 | Binning et al. | 210/761 |
| 4,751,067 | 6/1988 | Levin | 423/349 |
| 4,792,408 | 12/1988 | Titmas | 210/747 |
| 4,869,833 | 9/1989 | Binning et al. | 210/761 |
| 4,882,128 | 11/1989 | Hukvari et al. | 422/119 |
| 5,011,594 | 4/1991 | Haeffner et al. | 208/320 |
| 5,094,753 | 3/1992 | Allington et al. | 210/634 |
| 5,100,560 | 3/1992 | Huang | 210/721 |
| 5,132,014 | 7/1992 | Allington et al. | 210/634 |
| 5,133,877 | 7/1992 | Rofer et al. | 210/761 |
| 5,160,624 | 11/1992 | Clay et al. | 210/634 |
| 5,167,930 | 12/1992 | Fassbender | 422/112 |
| 5,173,188 | 12/1992 | Winter et al. | 210/634 |
| 5,198,197 | 3/1993 | Clay et al. | 422/256 |
| 5,244,638 | 9/1993 | Morris | 422/119 |
| 5,384,051 | 1/1995 | McGinnes | 210/761 |
| 5,387,398 | 2/1995 | Mueggenburg et al. | 422/168 |
| 5,558,783 | 9/1996 | McGuinness | 210/761 |
| 5,571,423 | 11/1996 | Daman | 210/761 |
| 5,571,424 | 11/1996 | Ahluwalia | 210/76.1 |
| 5,591,415 | 1/1997 | Dassel et al. | 422/241 |

FOREIGN PATENT DOCUMENTS

| | | |
|---|---|---|
| 1202200 | 1/1960 | France . |
| 851356 | of 0000 | Germany . |
| 1542005 | 3/1970 | Germany . |
| 8901822 | 3/1989 | WIPO . |

OTHER PUBLICATIONS

"A Less Expensive Way of Going Supercritical" Chemical Engineering Magazine, Dec. 1992 issue, p. 17.
"A Guide To Environmental Myths and Realities " by Lynn Scarlett Consumers Research, Jan. 1992, pp. 11–16.
Patent Abstracts of Japan. vol. 11, No. 89 (C–411) Mar. 19, 1987 & JP–A–61 242 629 (Toda Kogyo Corp.) Oct. 28, 1986, Abstract, Figure) & Database WPI, Section Ch, Week 8649, Derwent Publications Ltd., London, GB; Class J04, AN 86–323898 & JP–A–61 242 629 (Toda Kogyo K.K) Oct. 28, 1986, Abstract; Figure.
Search Report, Application No. EP 95 10 9643, Oct. 17, 1995.

*Primary Examiner*—Hien Tran
*Attorney, Agent, or Firm*—William D. Herrick

[57] ABSTRACT

Reactor for containing high pressure, high temperature, corrosive reactions, especially supercritical water reactions. The reactor comprises an inner reactor vessel which houses the corrosive reaction, an outer containment vessel which contains a substantial level of the pressure, and insulating means to contain the high temperature of the inner reactor, which prevents the outer containment vessel from rising above a specified maximum temperature. Using this reactor, the lifetime and reliability of the materials of construction are increased because the outer pressure-containing vessel does not experience the high temperatures which tend to cause metals and alloys to lose ductility, and the inner reactor vessel does not experience a high pressure drop across its walls and, therefore, can be made of temperature and corrosive-resistant materials which are not required to sustain high stress without failure.

9 Claims, 4 Drawing Sheets

REACTOR FOR HIGH TEMPERATURE, ELEVATED PRESSURE, CORROSIVE REACTIONS

This application is a continuation of U.S. application No. 08/267,703 filed Jun. 29, 1994, now abandoned.

BACKGROUND OF THE INVENTION

The present invention relates to the containment of high temperature, elevated pressure, corrosive reactions, such as supercritical water reactions and supercritical water oxidation reactions.

As used herein, "supercritical water reaction" refers to the broad class of chemical reactions occurring in a mixture containing a substantial portion of water at conditions near or above the critical point of pure water (the critical point of pure water is at 374.2° C. and 217.6 atm). Such reactions are unique in that the properties of water at these elevated temperatures and pressures are much different than at ambient conditions. Supercritical and near-supercritical water possess unique solution, catalytic and dielectric properties and can be highly corrosive. Salts tend to precipitate out of solution, while the water itself tends to act like a strong organic solvent as well as a catalyst for many organic degradation reactions.

"Supercritical water oxidation reaction" refers to a supercritical water reaction in which oxidant (e.g., $H_2O_2$, $O_2$, air) is added which reacts with an oxidizable substance (e.g., an organic) contained in the feed mixture.

Efficient containment of such reactions has become a major concern in commercialization of supercritical water processes due to the corrosive conditions, and the high pressures and high temperatures often required for optimum reaction pathways/kinetics. A current problem with existing commercial supercritical water oxidation reactor designs is that they all require materials which will, over a substantial period of time, withstand: (1) the high pressures of the reaction (greater than about 217 atm, or 3198 psi, or 21,980 KPa), (2) the high temperatures of the reaction (greater than about 374° C., often in excess of about 450° C.), and (3) the corrosive conditions that may occur. No known materials exist which will handle all of these conditions simultaneously.

Metal alloys tend to embrittle (de-anneal), as well as experience creep, when exposed to high temperatures such as those encountered in supercritical water oxidation reactions. This is especially the case for corrosion-resistant metal alloys such as nickel/chromium/iron blends, which embrittle near 500° C. This fact, coupled with the likelihood of corrosion-induced pitting or crazing on the surface of the metal alloy due to the corrosive nature of some supercritical water oxidation reactions, demands that an alternative material be used to contain the high pressure of the supercritical water oxidation reaction.

Certain ceramics and glasses are very resistant to corrosion, but do not possess the mechanical strength to contain the high pressures typical of supercritical water oxidation reactions. Some exotic metals and metal alloys are also corrosion-resistant, but may embrittle and/or creep at high temperatures under strain, or be cost-prohibitive to use on a commercial basis.

References exist in the literature regarding attempts to contain the high temperatures and/or pressures and corrosive natures of certain reactions, e.g., U.S. Pat. Nos. 5,094,753 and 5,132,014 Allington et. al.; U.S. Pat. Nos. 5,160,624 and 5,198,197 Clay et. al.; and U.S. Pat. No. 5,173,188 Winter et. al., teach the incorporation of a removable extraction cartridge used for supercritical fluid extraction. The removable cartridge has an insignificant pressure difference between its inside and outside walls, so that it need not have the strength to withstand significant pressures and can be made out of, e.g., molded plastic for disposable use. The extraction vessel is installed in a heated high pressure vessel. However, the extraction vessel would not effectively contain a high pressure, high temperature, corrosive reaction since, even if the cartridge was made of a corrosion-resistant, temperature resistant material, which is not taught, the same high temperature would be experienced by the entire apparatus, both inside and outside walls. Since the outside walls would be metal, embrittlement, loss of ductility and/or creep would eventually lead to failure of the pressure-containment vessel.

Battelle Pacific Northwest Laboratories (Richland, Wash.) has disclosed a reactor which "uses a thin insert of a corrosion-resistant metal, such as titanium or zirconium, that fits close to the wall of a carbon-steel pressure vessel". The space between the two is filled with a commercial high-temperature heat transfer fluid. The insert is designed so that it can expand toward the pressure vessel outer wall when pressurized. The heat transfer fluid balances the pressure (as described in *Chemical Engineering Magazine*, December, 1992, page 17). This concept is similar to Allington et. al. in that an outer vessel contains the high pressure while the inner vessel does not experience a large pressure drop across its walls. However, neither Allington et. al. nor Battelle's publication addresses the failure of the pressure-containing vessel when exposed to extended high temperatures such as those of supercritical water reactions. Rather, Battelle's publication teaches transfer of heat from the inner to the outer vessel using a heat-transfer fluid. This type of reactor has the following disadvantages: when the outer carbon-steel vessel is exposed to high temperatures, e.g., in the range of about 400–700° C., it will lose its ductility and may no longer be able to safely provide sufficient strength to contain the pressure. Its effective life is shortened by being brought to high temperatures.

Swift et. al. in U.S. Pat. No. 4,670,404, teaches of using a thin-walled cylindrical batch reactor which is thermally insulated from the walls of a surrounding containment unit, as a pilot apparatus to design full-scale processes and emergency pressure-relief systems. However, Swift et. al. do not address or solve the problem of a potentially corrosive reaction, nor do they address the material concerns associated with an extended high-pressure, high temperature reaction. Rather, their focus is solely to design an emergency relief system which will operate regardless of whether a liquid or gas is discharged from the reactor containing a runaway exothermic reaction. No specific mention is made of containing a high pressure, high temperature, corrosive reaction.

Binning et. al., in U.S. Pat. 4,721,575 and 4,869,833, teach a tubular plug-flow wet-oxidation reactor in which walls are exposed to potentially large pressure drops, while being immersed in a liquid heat-transfer fluid contained in a containment vessel. No solutions were disclosed for containing a high pressure, high temperature, corrosive fluid within the reactor for an extended period. Rather, Binning et. al. focused on improved mixing inside the reactor due to its curved shape.

In U.S. Pat. No. 5,100,560, Huang et. al. teaches a supercritical water oxidation reactor which serves to remove precipitates from the reaction zone as they are formed, but Huang has in no way addressed the issue of high temperature, high pressure, corrosive conditions as in a supercritical water environment.

In U.S. Pat. No. 4,792,408, Titmas et. al. teaches an underground deep-well injection reactor but Titmas et. al. have in no way addressed the issue of high temperature, high pressure, corrosive conditions as in a supercritical water environment.

Significantly, none of these references in any way discloses or suggests a means to contain high temperature, high pressure, corrosive reactions such as supercritical water reactions in an effective, economical and reliable way.

It is an object of the present invention to provide a "reactor within a vessel," in which the "inner" reactor contains the supercritical water oxidation reactants and products, and is made of a material which is resistant to corrosion and can withstand high temperatures, while the "outer" vessel contains the high pressure at a temperature substantially lower than the "inner" reactor.

The reactor of this invention withstands both the operating conditions and corrosive nature of such reactions in a way that is efficient and adaptable to commercial operations.

SUMMARY OF THE INVENTION

In view of the foregoing background, it is an object of the present invention to provide a method for containing a high temperature, high pressure, corrosive reaction adaptable to a commercial-scale system. More particularly, it is an object of the invention to provide a method to contain such a reaction with corrosion-resistant and high temperature-resistant materials without subjecting these materials to severe stresses which might cause failure. It is also an object of the invention to provide a method to contain the high pressure of the reaction using pressure (stress/strain)-resistant materials without subjecting these materials to high temperatures or to corrosive conditions, which might lead to failure (creep, crazing, loss of ductility, cracking, fissure and the like). It is a further object of the invention to provide a method for insulating the pressure-containing materials from the high temperature of the reactor containing the corrosive materials. Other objects and advantages of the present invention will be apparent to those skilled in the art and are intended to be embraced by the scope of the appended claims.

To achieve the foregoing and other objects, the invention provides an apparatus for containing a high pressure, high temperature, corrosive reaction by: (1) providing an "inner reaction vessel", having an inlet port and an outlet port, which contains, for example, the supercritical water or supercritical water oxidation reactants, intermediates, and products, and is made of a material which is resistant to corrosion and can withstand high temperature, e.g. a super alloy lined with a chemical resistant material, (2) providing an "outer containment vessel", having an inlet port and an outlet port, which contains the high pressure at a temperature substantially lower than the "inner reactor", and is made of a material which is able to effectively contain high pressure, e.g., carbon steel, (3) providing a means for coupling the outer containment vessel inlet and outlet ports to the inner reaction vessel's inlet and outlet port, and (4) also, providing a means for coupling the outer containment vessel inlet and outlet ports to a fluid feed port and a fluid exit port, so that when the outer containment vessel is coupled to both the fluid feed and exit ports, as well as the inlet and outlet ports of the inner reaction vessel, the content of the inner reaction vessel is sealed off from the outer containment vessel. In addition, this invention may include means for insulating the outer containment vessel from the high temperatures of the inner reaction vessel by means of insulating materials located between the inner and outer vessels, and/or by an insulating fluid added between the inner and outer vessels, with means to cool the insulating fluid as needed to keep it below a specified maximum temperature. The insulating materials can be any high temperature-resistant commercial insulating product, such as glass wool. The insulating fluid can be helium or any other inert gas, nitrogen, carbon dioxide, air and the like, or mixtures U thereof.

The insulating fluid is kept below a preset maximum temperature in order to prolong the life of the outer reaction vessel materials of construction. This may be further accomplished by routing the insulating fluid through a water-cooled heat exchanger (designed to compensate for the high-pressure of the insulating fluid).

The inner reactor vessel materials of construction are resistant to high temperatures and to corrosive conditions, and include the broad range of high temperature-fired ceramics, glasses, corrosion-resistant metals such as titanium, corrosion-resistant metal alloys such as nickel-chromium-iron blends, and temperature and corrosion resistant composites and polymers. More specific examples include any super alloy (Ni—Cr—Fe based alloy, e.g. Inconel™ X) lined with a chemical resistant layer such as $SiO_2$ ceramic, $SiO_2$ glass, aluminum metal, chromium metal, boride, carbide, blown glass (100% $SiO_2$), titanium-based alloy, silicone carbide high temperature fired ceramic, and aluminum oxide high temperature fired ceramic. The outer containment vessel materials of construction, which serve to contain the pressure around the inner reaction vessel, include carbon steels, metal alloys and stress/strain-resistant polymers.

The inner reaction vessel is, for example, a plug-flow type reactor, a continuous stirred-tank reactor, or a combination of several reactor types. Any appropriate means of heat exchange may be incorporated to transfer the heat of reaction to preheat the feed. A tubular coiled plug-flow reactor provides the additional advantage of absorbing the strain caused by temperature changes during start-up, operation and shut-down.

Pumps for the feed streams, e.g., the organic stream and the oxidant, may be piston-type or centrifugal-type pumps.

The pressure between the inner and outer vessels may be regulated via a computerized feedback system which reads pressure transducers placed at appropriate locations in the system, and which operates a series of pumps and valves which serve to regulate the pressure in a manner known to those skilled in this art. The pressure between the inner and outer vessels is maintained such that the pressure drop across the walls of the inner reaction vessel are below a certain predetermined maximum allowable level based on the chosen materials of construction and the particular reaction conditions to prevent failure and to extend the life of the inner reaction vessel.

The reactor feed mixture may be advantageously preheated via direct ohmic heating, heating tape, or a heat exchanger using steam. Alternatively, or in addition, a heat exchanger which transfers heats of reaction to the feed may be incorporated.

A throttling valve may be used to adiabatically expand the product stream, thus, lowering its pressure and temperature.

The outer surface of the outer containment vessel may additionally be cooled, e.g., with cooling water or air flow, to further assure that the temperature of the outer vessel materials do not exceed a preset maximum.

DETAILED DESCRIPTION OF THE INVENTION

Figure 1:
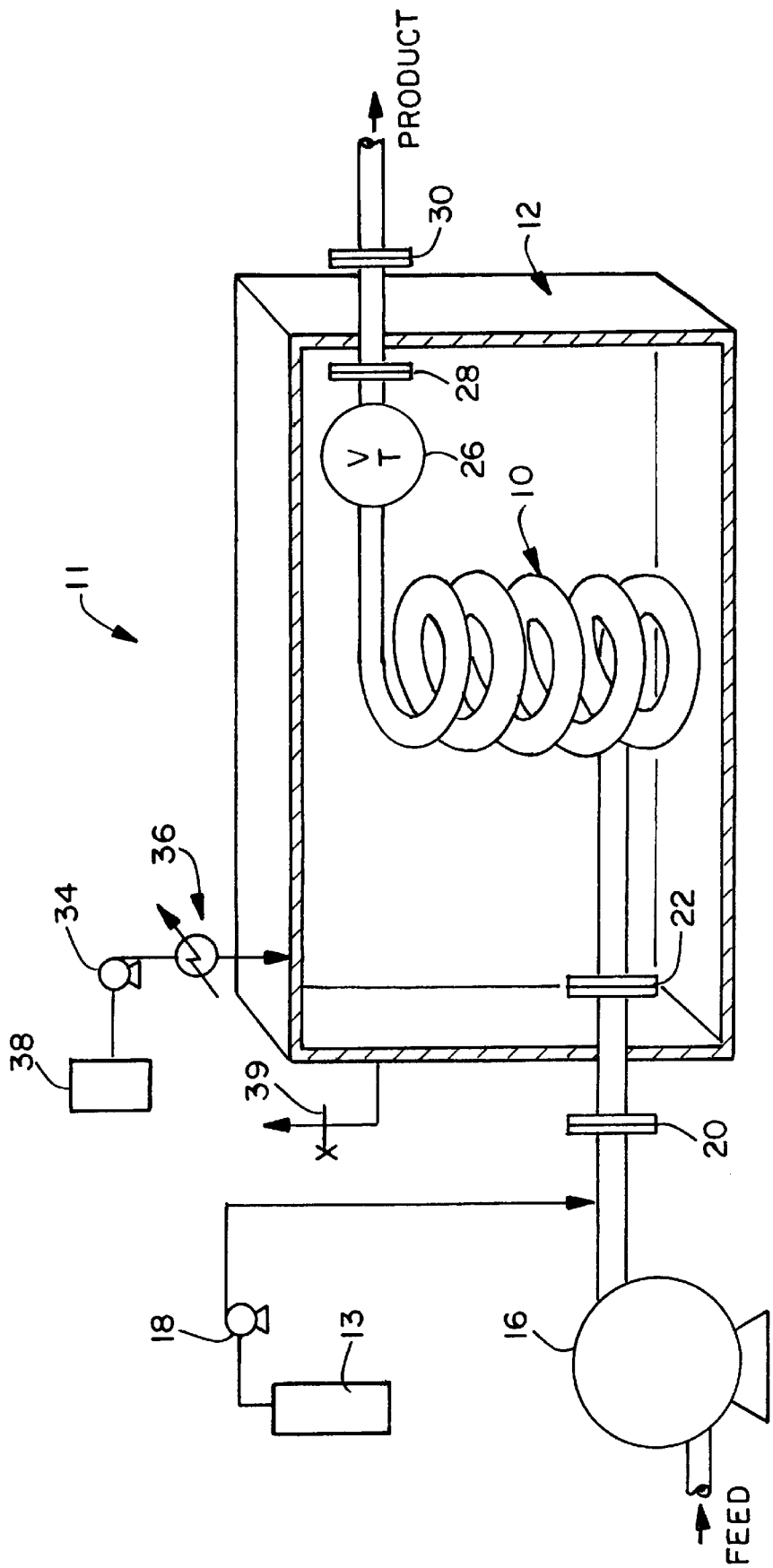
FIGS. 1 and 2 illustrate, in partial cross-section, a schematic view of one reactor embodiment of the invention.
Figure 2:
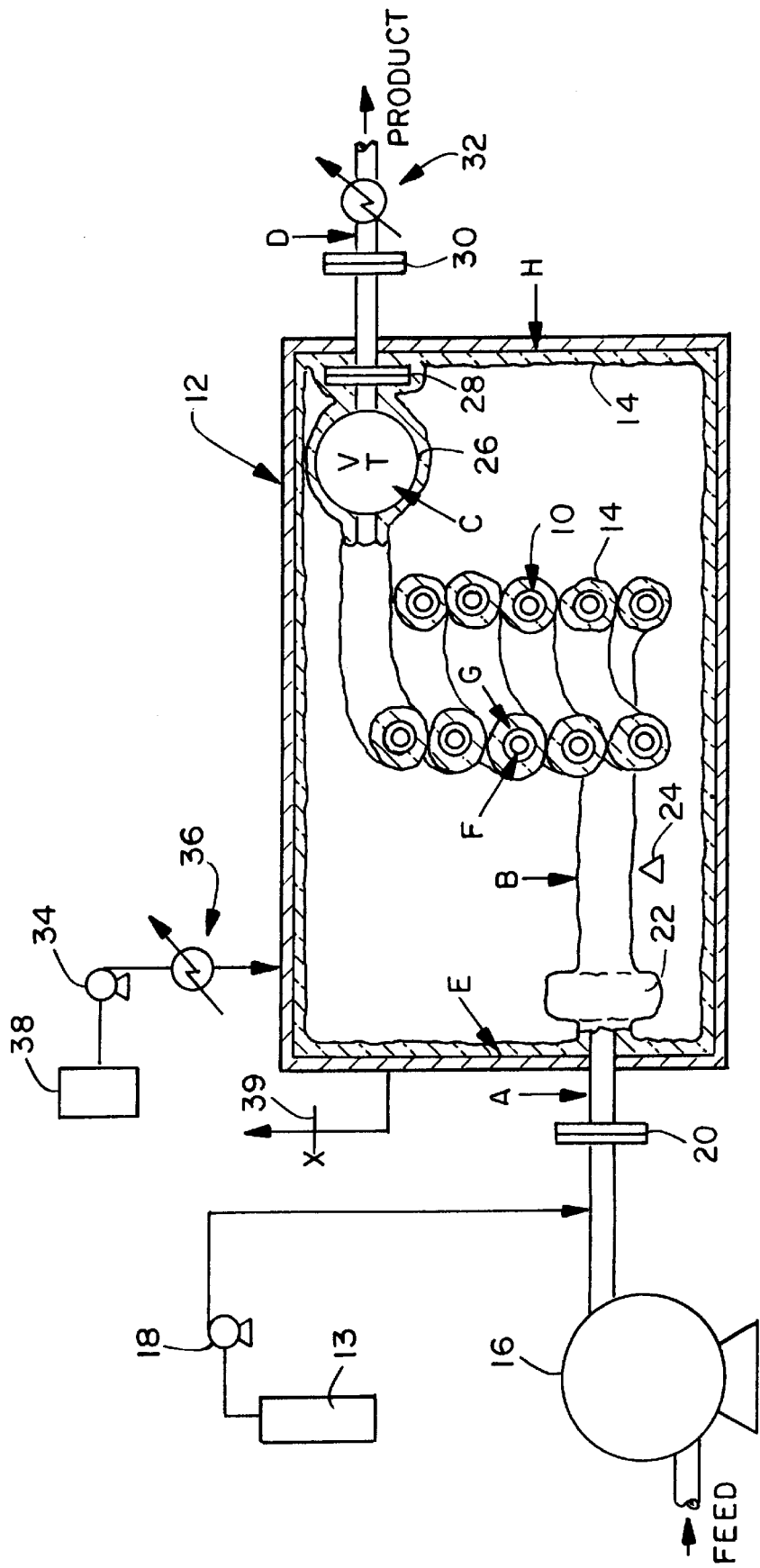

The reactor 11 of the present invention is shown in FIGS. 1 and 2. It utilizes a ceramic, titanium, glass, metal alloy, or other corrosion-resistant material or lined composite to contain the supercritical water oxidation reaction in what is termed the "inner reactor", shown in FIG. 1 in a partial perspective view and in FIG. 2 as a cross-sectional view as component 10. This inner reactor 10 is coupled with what is termed an "outer containment vessel" 12, which is a vessel made of a metal alloy such as carbon steel to contain the pressure. The "inner reactor" 10 does not experience an appreciable pressure drop across its walls because the outer vessel 12 acts to surround the inner vessel 10 with an inert, temperature-insulating fluid (such as helium or nitrogen) at approximately the same pressure as the supercritical water oxidation reaction fluid inside the inner reactor 10.

The inner reactor 10 is, in addition, advantageously coated on its outer surface with an appropriate insulating material 14 which will further act to contain the high temperature of the supercritical water oxidation reaction inside the inner reactor 10. The insulating material 14 and the temperature-insulating fluid surrounding the inner reactor 10 maintain the outer vessel 12 at a more moderate (lower) temperature, serving to retain its ductility for a longer period. The separation of the outer vessel 12 and the inner reactor 10 also serves to restrict the corrosive conditions to the inner reactor's 10 inner wall, protecting the outer vessel 12 from any corrosive conditions.

In general, Pumps 16 and 18 deliver pressurized reactants, e.g., aqueous organic waste such as pulp mill sludge, municipal sludge, or other aqueous wastes, at ambient temperatures and pressure above about 3000 psi, and, e.g., oxidant supply 13 such as air, oxygen, or hydrogen peroxide, to connector 20, which connects the pumps' piping with the outer vessel 12, and which could be a wedged-type fitting. Reactant fluid mixture then flows from connector 20 to connector 22. Parts of the 20 and 22 connectors are, in this particular embodiment, continuous with the outer containment vessel 12, and may incorporate appropriate gaskets as needed. Connector 22 connects the outer vessel 12 with the inner reactor 10.

Reactant mixture at point A is heated at the feed preheat zone to appropriate temperatures, e.g., between about 300 and about 500° C., by heating element 24. Heating element 24 may be, for example, a battery-powered heating tape or direct resistive heating; or, alternatively, it may be a heat exchanger-type arrangement which would transfer heat from the exothermic heat of reaction, generated further downstream within inner reactor 10, to the feed at the preheat zone. Inner reactor 10 may be a plug-flow type reactor or a stirred-tank type reactor, or a variation/combination of the two. In inner reactor 10, reactants are exothermically converted to products, e.g., organic carbon is oxidized to carbon dioxide. Reaction products exit inner reactor 10 and flow through pressure-reduction valve 26, in which an adiabatic expansion occurs and the pressure and temperature both drop significantly.

The exit fluid flows out through connectors 28 and 30, and residual heat is removed by appropriate means as desired, e.g., heat exchanger 32. It may be desirable to have pressure reduction valve 26 positioned downstream of connector 28, inside or outside the outer vessel 12, depending on the materials of construction desired for valve 26 and their ability to withstand the pressure drop across the orifice and walls.

Pump 34 delivers insulating fluid to the inside of outer containment vessel 12 as needed during start-up, run-time, and shut-down, to maintain near-zero pressure drop across the walls of inner reactor 10. In addition, a cooling means 36 may be employed such as a water-cooled heat exchanger to regulate the temperature of the insulating fluid. Makeup tank 38 provides a reservoir of insulating fluid. Valve 39 purges insulating fluid from the outer containment vessel 12 as part of the pressure-regulating mechanism.

Figure 3:
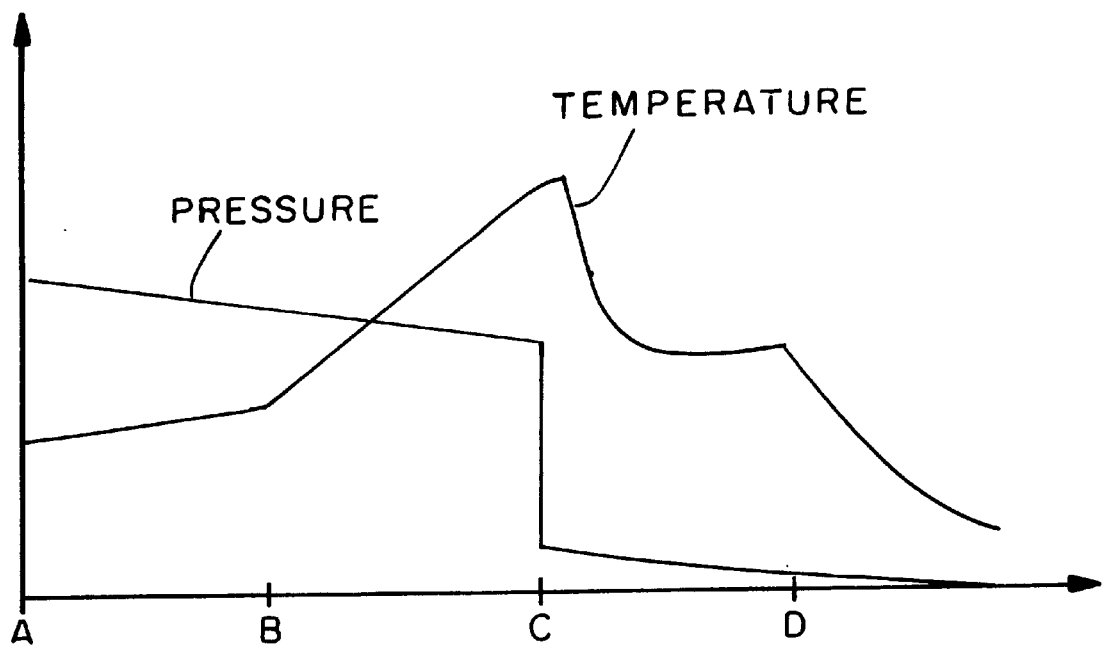
FIGS. 3 and 4 illustrate in graph form temperature and pressure profiles of embodiments of the present invention.

FIG. 3 shows, qualitatively, the temperature and pressure profiles along the inner reaction vessel 10. Temperature rises at the reactor preheat zone at point B due to heating element 24, and rises along inner reactor 10 due to the heat released in the exothermic supercritical water oxidation reaction (oxidization of organics to form carbon dioxide and water). The temperature drops at point C pressure reduction valve 26 due to essentially adiabatic expansion of the pressurized fluid. Further heat removal at point D at heat exchanger 32 leads to a further temperature drop. Along the length of the inner reactor 10, there will be a slight pressure drop which serves to move the fluid along the reactor. Also, a significant pressure drop occurs downstream of inner reactor 10 at point C at pressure reduction valve 26.

Figure 4:
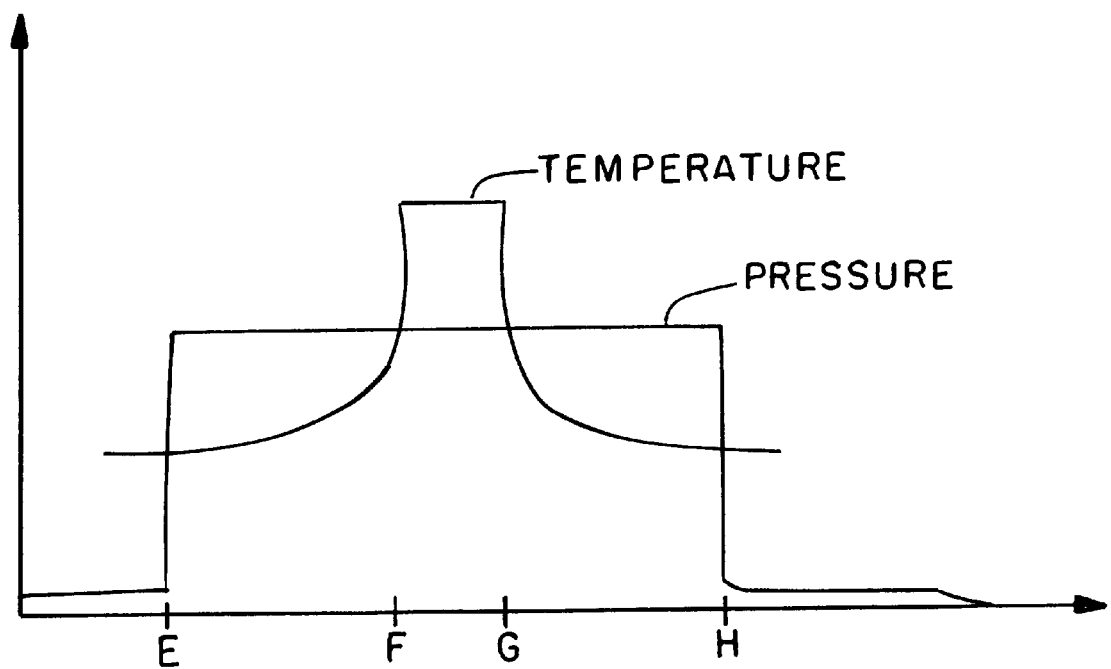

FIG. 4 shows, qualitatively, the temperature and pressure profiles through the outer containment vessel 12 and through a slice of the inner reactor 10. Moving from left to right on FIG. 4, there is substantial pressure rise at E across the left outer vessel (12) wall, negligible pressure change at F & G across the inner reactor (10) walls, and a large pressure drop to ambient pressure at H across right outer vessel (12) wall.

Figure 5:
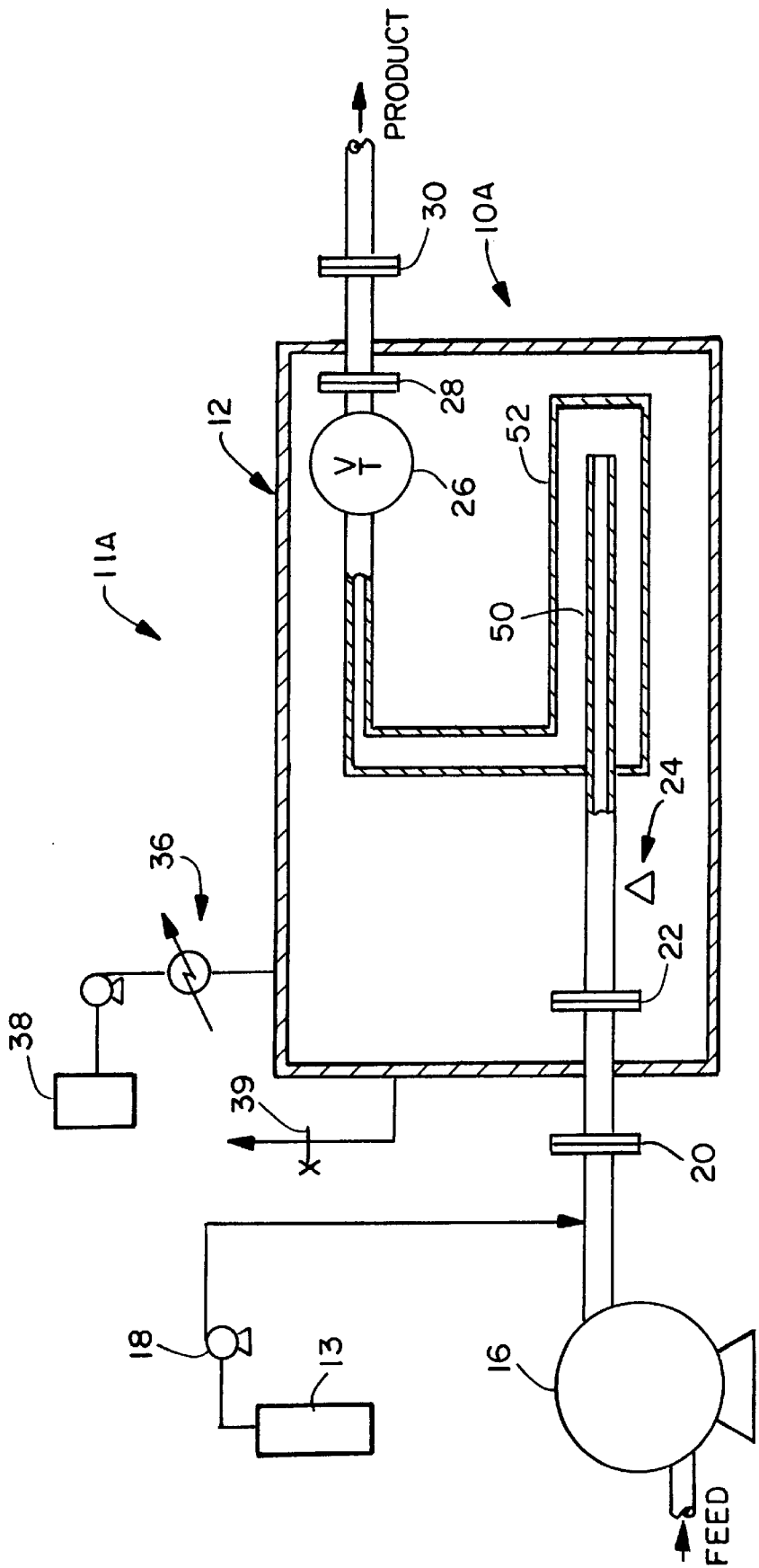
FIG. 5 illustrates in partial cross-section a second embodiment of the reactor of the present invention.

FIG. 5 shows an alternative embodiment 11a in which inner reactor 10A contains a built-in heat exchanger, with concentric cylinders 50 and 52, which transfers the exothermic heat of reaction to the feed to further preheat the feed stream. In this alternative embodiment, insulation may be accomplished solely by the insulating fluid surrounding inner reactor/heat exchanger 10A as shown.

EXAMPLE 1

This example illustrates how a commercial supercritical water oxidation system could be built to treat pulp and paper mill sludges.

The inner reactor is a tubular plug-flow type reactor made of Inconel™ X lined with an aluminum-oxide glass or ceramic coating which is stable at temperatures up to at least 700° C. This inner reactor is surrounded with temperature-insulating material such as glass wool. The outer containment vessel is carbon steel. The insulating fluid is nitrogen gas. A cooling mechanism exists for the nitrogen gas to keep its temperature below about 100 to 400° C. Pressure transducers located inside the inner reactor and inside the outer containment vessel feed a computerized feedback system which operates a series of pumps and valves which serve to regulate the pressure of the outer containment vessel to assure that the pressure drop across the walls of the ceramic inner reaction vessel is maintained below about 5 atm. The feed mixture consists of a pulp and/or paper mill sludge slurry containing 80–90% water. After the sludge feed is pressurized to about 3000 psi, pure oxygen gas is added in a stoichiometric ratio of about 2:1 and the mixture is subsequently pre-heated to 300–400° C. as it enters the inner reactor, where it reacts exothermically to form $CO_2$ and $H_2O$ at a temperature in the range of 400–700° C. Upon leaving the reactor, the product mixture enters a throttling valve, essentially expanding adiabatically and thus lowering its temperature and pressure. Further cooling means via a water-cooled shell-and-tube heat exchanger serves to cool the product stream enough to recover the $CO_2$ and discharge (or store or recycle) the product water.

Variations to Example 1 will be apparent to those skilled in the art. For example, the inner reactor may be made of blown glass. In addition, the inner reactor may contain a built-in heat exchanger which transfers the exothermic heat of reaction to the feed to preheat the feed. The insulating fluid may be helium, nitrogen, air, carbon dioxide, or mixtures thereof. The feed stream may be municipal sludge.

Although a preferred embodiment of the invention has been described in some detail, many modifications and variations of the preferred embodiment will be apparent to those skilled in the art and can be made without departing from the invention. Therefore, it is to be understood that the invention is intended to include such modifications and variations as fall within the broad scope of the appended claims.

I claim:

1. Reactor apparatus for containing a reaction, comprising:
   a. an outer containment vessel having an inlet port and an outlet port and being capable of withstanding high pressure conditions for an extended period sufficient to provide efficient commercial operation;
   b. an inner reaction vessel having an inlet port and an outlet port and being capable of withstanding corrosive supercritical water reaction conditions for an extended period sufficient to provide efficient commercial operation;
   c. means for coupling said outer containment vessel inlet and said outlet ports to said inner reaction vessel inlet and outlet ports;
   d. said outer containment vessel also having means to couple its inlet and outlet ports to a fluid feed port and a fluid exit port;
   e. heat insulation means between said inner reaction vessel and said outer containment vessel, said heat insulation means:
      comprising inert heat insulating fluid contained in said outer containment vessel and surrounding said outer side of said inner reaction vessel;
   f. means for maintaining said heat insulation means below a preset maximum temperature to prolong the life of said outer containment vessel; and
   g. means to regulate the pressure of said inert insulating fluid; whereby, when said outer containment vessel is coupled to fluid feed and fluid exit ports and to the inner reaction vessel inlet and outlet ports, said inner reaction vessel interior is sealed off from the interior of said outer containment vessel.

2. Apparatus of claim 1 wherein said outer containment vessel comprises material selected from the group consisting of carbon steels, metal alloys, and stress/strain-resistant polymers and composites.

3. Apparatus of claim 1 in which said inner reaction vessel is selected from the group consisting of:
   a. a continuous stirred tank reactor;
   b. a plug-flow reactor;
   c. a plug-flow reactor with heat exchanger system which transfers downstream heat of reaction to upstream (cooler) feed;
   d. a tubular coiled reactor designed to withstand strain due to temperature changes in reactor materials; or
   e. combinations thereof.

4. Apparatus of claim 1 in which said feed comprises a pump selected from the group consisting of piston pumps or centrifugal pumps.

5. Apparatus of claim 1 wherein said pressure regulation means comprises a computerized feedback system which reads pressure transducers inside inner reaction vessel and inside outer containment vessel, said feedback system operating a series of pumps and valves which serve to regulate the pressure of the outer containment vessel to assure that the pressure drop across of the inner reaction vessel is maintained below a certain predetermined maximum allowable level to prevent failure and extend life of the inner reaction vessel.

6. Apparatus of claim 1 further comprising a feed preheat zone upstream of the inner reaction vessel.

7. Apparatus of claim 1 further comprising a throttling valve, downstream of the inner reaction vessel, which serves to lower the pressure and temperature adiabatically of said fluid product.

8. Apparatus of claim 1 further comprising means for cooling the outer surface of said outer containment vessel.

9. Apparatus of claim 1 further comprising means for supplying a feed stream for an exothermic reaction and a built-in heat exchanger as part of the inner reaction vessel which serves to transfer exothermic heat of reaction to the feed stream.

* * * * *